United States Patent Office 3,187,022
Patented June 1, 1965

3,187,022
17β-AMINO-17α-PREGNEN-20-ONE COMPOUNDS
AND THE PRODUCTION THEREOF
Duane F. Morrow, Ann Arbor, Mich., assignor to Parke,
Davis & Company, Detroit, Mich., a corporation of
Michigan
No Drawing. Filed Jan. 31, 1964, Ser. No. 341,755
8 Claims. (Cl. 260—397.3)

This invention relates to new steroid compounds of the pregnene series. More particularly, it relates to new 17β-amino-17α-pregnen-20-one compounds that can be represented by the formula

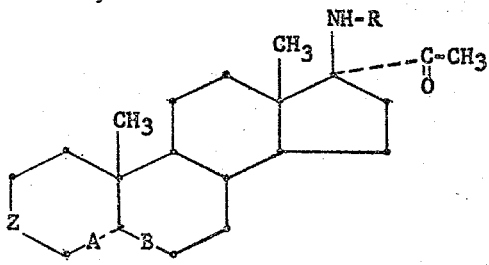

(I)

to pharmaceutically-acceptable acid-addition salts thereof, and to methods for their production. In the foregoing formula R is hydrogen or lower alkyl; Z represents a carbonyl (CO) or a β-hydroxymethylene (CHOH) group; A represents a double bond when Z is a carbonyl group and a single bond when Z is a β-hydroxymethylene group; and B represents a single bond when Z is a carbonyl group and a double bond when Z is a β-hydroxymethylene group.

In accordance with the invention, 17β-amino-17α-pregn-5-en-3β-ol-20-one, having the formula

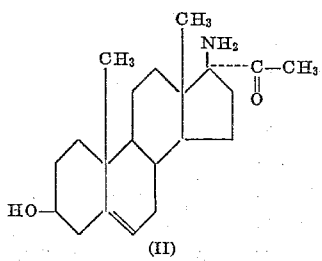

(II)

is produced by the reaction of a compound of the formula

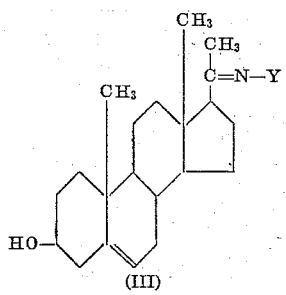

(III)

with a base, followed by hydrolysis of the reaction product mixture with an acidic aqueous medium; where Y represents a readily displaceable moiety, such as the tosylate, acetate, halide, or trialkyl quaternary ammonium salt grouping. The preferred moiety is the trialkyl quaternary ammonium salt grouping, that is, where Y is

(IV)

wherein $R_1$ is lower alkyl, preferably methyl, and $X^-$ is one equivalent of a monovalent anion, such as the halide, methosulfate, benzenesulfonate, p-toluenesulfonate, and the like. The first stage of this process, the reaction of the compound of Formula III with a base, is preferably carried out in the presence of a solvent. Suitable solvents are lower alkanols, such as ethanol; ethers, such as diethylene glycol dimethyl ether and tetrahydrofuran; amides, such as N,N-dimethylformamide; and dimethylsulfoxide. A preferred solvent is a lower alkanol, such as ethanol. A variety of bases may be used in this first stage, including alkali metal hydroxides, alkali metal hydrides, lower alkoxides, and amides. A preferred base is an alkali metal hydride, such as sodium hydride. At least one equivalent, and preferably an excess, of base is employed. The time and temperature of this first stage are not critical and may be varied over a wide range. Normally, the reaction is carried out at a temperature in the range of 25° to 80° C. for a period of one to four hours. At the completion of the first stage of this process, the reaction product mixture is hydrolyzed with an acidic aqueous medium. The preferred medium for this purpose is a mixture of an aqueous mineral acid, such as hydrochloric or sulfuric, and a lower alkanol solvent, such as ethanol. The hydrolysis is normally carried out for a period of 30–90 minutes at a temperature in the range of 80–120° C.

When the first stage of the foregoing process is carried out in a suitable solvent other than a lower alkanol, the intermediate spiroazirine compound, 3′-methylspiro-[17-(1′)β-androst-5-en-17,2′(2′H)azirin]-3β-ol, of the formula

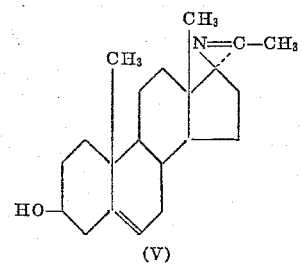

(V)

may be isolated and purified, if desired, prior to hydrolysis. The isolated intermediate is then hydrolyzed with aqueous mineral acid in a lower alkanol solvent under the same conditions as described above.

The trialkylhydrazonium salt of pregnenolone, that is, the compound of Formula III wherein Y is a trialkyl quaternary ammonium salt grouping, which is the preferred starting material for use in the foregoing process, can be prepared by reacting pregnenolone dimethylhydrazone with an alkylating agent, such as methyl iodide, in a suitable solvent.

Also in accordance with the invention, 17β-amino-17α-pregn-4-en-3,20-dione, having the formula

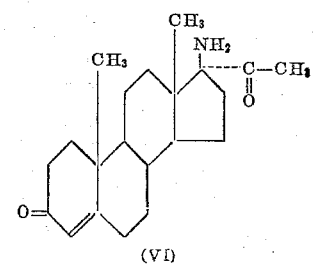

(VI)

is produced by the oxidation of a Schiff base of 17β-amino-17α-pregn-5-en-3β-ol-20-one, having the formula

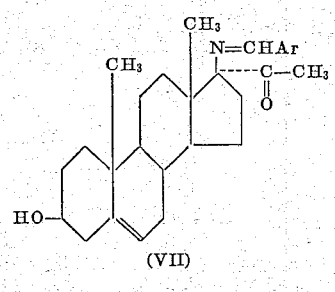

(VII)

followed by hydrolysis of the intermediate Schiff base of 17β-amino-17α-pregn-4-en-3,20-dione, having the formula

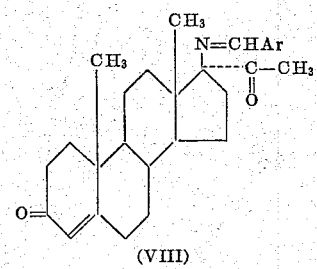

(VIII)

with an acidic aqueous medium; where Ar represents an aryl group, which is preferably phenyl. The oxidation stage of this process is preferably carried out by reaction of the Schiff base of 17β-amino-17α-pregn-5-en-3β-ol-20-one of Formula VII with an aluminum alkoxide or phenoxide and a carbonyl compound, such as acetone or cyclohexanone, in an anhydrous inert aromatic solvent, such as benzene, toluene, or xylene, followed by hydrolysis of the reaction mixture with an aqueous medium. Preferred reagents for the oxidation are aluminum isopropoxide and cyclohexanone, and the preferred solvent is toluene. The amounts of reagents may be varied, and preferably each is used in excess. For best results, 1 to 3 moles of aluminum alkoxide and 10 to 50 moles of carbonyl compound per mole of steroid compound are employed. The time and temperature may be varried over a wide range, depending on the choice of solvent and carbonyl compound. In ordinary practice, the oxidation is carried out at the reflux temperature of the solvent for a period of one-half to 24 hours. When the oxidation is complete, the reaction mixture is hydrolyzed with an aqueous medium, such as water, dilute aqueous inorganic acids or bases and other media containing water, such as an aqueous solution of sodium potassium tartrate. Following hydrolysis of the oxidative reaction mixture, which is preferably accomplished with an aqueous solution of sodium potassium tartrate, the intermediate Schiff base compound of Formula VIII is hydrolyzed with an acidic aqueous medium. This hydrolysis is preferably carried out in a lower alkanol solvent employing an aqueous mineral acid, such as hydrochloric or sulfuric, at a temperature in the range of 80–120° C. for a period of 10 minutes to one hour. Prior to this hydrolysis step, the intermediate Schiff base may, but need not be, isolated and purified.

The Schiff base of 17β-amino-17α-pregn-5-en-3β-ol-20-one of Formula VII used as starting material in the foregoing process can be prepared by reaction of 17β-amino-17α-pregn-5-en-3β-ol-20-one with an aromatic aldehyde such as benzaldehyde.

Further in accordance with the invention 17β-amino-17α-pregnen-20-one compounds having the formula

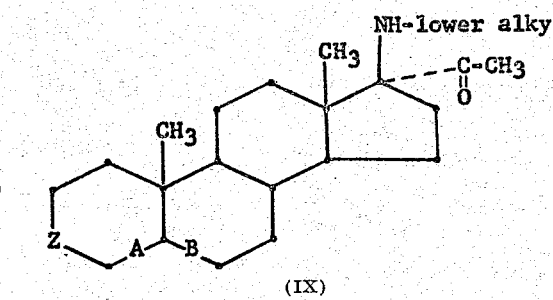

(IX)

are produced by reaction of a Schiff base compound, having the formula

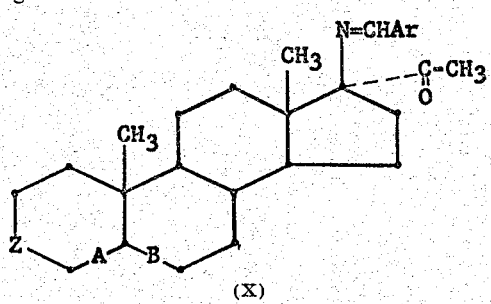

(X)

with an alkylating agent, followed by hydrolysis of the intermediate Schiff base quaternary salt, having the formula

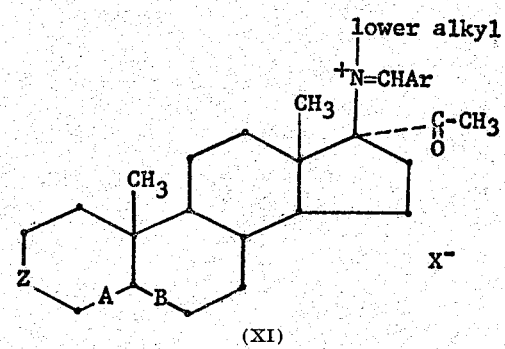

(XI)

with an aqueous medium; where A, B, X⁻, Z, and Ar have the same meanings as given before. The alkylation step of this process is carried out in an inert anhydrous solvent. Suitable solvents are ketones, such as acetone and diethyl ketone; esters, such as ethyl acetate; ethers, such as tetrahydrofuran; aromatic hydrocarbons, such as benzene, toluene, and xylene; halogenated hydrocarbons, such as carbon tetrachloride; and nitriles, such as acetonitrile. A preferred solvent is acetonitrile. The time and temperature are not critical and may be varied over a wide range. It is preferable to carry out the alkylation at the reflux temperature for a period of 24 to 120 hours. At least one mole, and preferably a large excess, of alkylating agent per mole of Schiff base is employed. Upon completion of the alkylation step of this process the intermediate Schiff base quaternary salt of Formula XI is hydrolyzed by treatment with an aqueous medium. The preferred medium is an aqueous mineral acid, such as hydrochloric or sulfuric. Hydrolysis is rapid and complete in a few minutes at room temperature. Longer times and higher temperatures may also be employed, however.

The free base compounds of the invention form acid-addition salts with a variety of inorganic and organic acids. Pharmaceutically-acceptable acid-addition salts are formed by the reaction of the free bases with such acids as hydrochloric, hydrobromic, hydriodic, sulfuric, acetic, benzoic, citric, tartaric, maleic, and related acids.

The salt formation is suitabl,y carried out by reacting the selected base with the selected acid in an unreactive solvent. The acid-addition salts can be converted to the free bases by reaction with a base such as sodium carbonate or potassium carbonate. In the applications of this invention, the compounds are preferably employed in the form of their acid-addition salts.

The compounds of the invention are useful as pharmacological agents, having hypocholesteremic and progestational activity, and as chemical intermediates. The preferred compound for use as a hypocholestermic agent is 17β-amino-17α-pregn-5-en-3β-ol-20-one, and the preferred progestational agent is 17β-amino-17α-pregn-4-en-3,20-dione. They are active upon oral administration. As chemical intermediates, the compounds of the invention are useful in the synthesis of 17-amino-17-methyl-D-homoandrostan-17a-ol compounds. For example, 17β-methylamino-17α-pregn-5-en-3β-ol-20-one can be converted by pyrolysis at 200° C. and subsequent reaction with lithium aluminum hydride to 17-methyl-amino-17-methyl-D-homoandrost-5-ene-3β,17a-diol.

The invention is illustrated by the following examples.

*Example 1*

A solution of 15.0 g. of 2-(3β-hydroxypregn-5-ene-20-ylidene)-1,1,1-trimethylhydrazonium iodide in 100 ml. of dimethylsulfoxide and 1000 ml. of absolute ethanol is treated with 7.5 g. of a 53% dispersion of sodium hydride in mineral oil. The resulting solution is heated under reflux for two hours, cooled, and concentrated under reduced pressure to a volume of about 150 ml. To this solution is added 500 ml. of benzene, 1000 ml. of ether, and 1000 ml. of water. The organic phase is separated, washed well with water, dried over anhydrous magnesium sulfate, and evaporated to dryness on a steam bath. The oily residue obtained is dissolved in 100 ml. of absolute ethanol, 100 ml. of 6N hydrochloric acid is added, and the mixture is heated at 90–100° C. for 30 minutes. The solution is then diluted with 3 liters of water, washed well with ether, and neutralized with concentrated aqueous sodium hydroxide. Solid potassium carbonate is added and the solid 17β-amino-17α-pregn-5-en-3β-ol-20-one obtained is isolated by filtration, washed well with water and dried under reduced pressure. The hydrochloride salt is obtained by treating an ether solution of the free base with a slight excess of anhydrous hydrogen chloride; M.P. 256–258° C., after crystallization from ethanol-ethyl acetate; $[\alpha]_D^{26}$, −7° (1% in methanol).

The 2 - (3β - hydroxypregn-5-en-20-ylidene) - 1,1,1-trimethylhydrazonium iodide used as starting material in the foregoing procedure is prepared as follows. A suspension of 7.35 g. of pregnenolone dimethylhydrazone in 60 ml. of benzene and 400 ml. of acetonitrile is treated with 50 ml. of methyl iodide and the mixture is stirred at room temperature for 24 hours. The mixture is then diluted with 500 ml. of ether and the 2-(3β-hydroxypregn-5-en-20-ylidene)-1,1,1-trimethylhydrazonium iodide that precipitates is collected and dried; M.P. 214.5–215.5° C., after crystallization from acetonitrile.

*Example 2*

A solution of 10.0 g. of 2-(3β-hydroxypregn-5-en-20-ylidene)-1,1,1-trimethylhydrazonium iodide in 125 ml. of dimethylsulfoxide is treated with 1.1 g. of a 53% dispersion of sodium hydride in mineral oil and the resulting mixture is stirred at room temperature for two hours. After dilution with 600 ml. of benzene, 600 ml. of ether, and 600 ml. of water, the organic phase is separated, washed well with water, dried over anhydrous magnesium sulfate and evaporated to dryness on a steam bath. The residual oil is triturated with ether and cooled. The crystalline 3′- methylspiro[17(1′)β - androst-5-en-17,2′(2′H) azirin]-3β-ol obtained is isolated, dried under reduced pressure, and crystallized from benzene-acetonitrile; M.P. 235.5–236° C.; $[\alpha]_D^{24}$, −93° (1% in methanol).

A solution of 200 mg. of 3′-methylspiro[17-(1′)β-androst-5-en-17,2′(2′H)azirin]-3β-ol in 10 ml. of absolute ethanol is treated with 2 ml. of 6 N hydrochloric acid and the mixture is warmed on a steam bath for one hour. The solution is then diluted with water, and the aqueous solution is extracted with ether and neutralized with concentrated aqueous sodium hydroxide. The solid 17β-amino-17α-pregn-5-en-3β-ol-20-one obtained is isolated, washed with water and dried under reduced pressure. This product is identical to that obtained as described in Example 1.

*Example 3*

A mixture of 2.4 g. of 17β-benzylideneamino-17α-pregn-5-en-3β-ol-20-one, 140 ml. of toluene, 29 ml. of cyclohexanone, and 3.6 g. of aluminum isopropoxide is heated under reflux for 1¼ hours. The cooled solution is diluted with ether, washed three times with saturated aqueous sodium potassium tartrate, twice with water, and dried over anhydrous magnesium sulfate. After the solvent is evaporated from the dried solution under reduced pressure, the residue is dissolved in anhydrous ether and the solution is treated with an excess of dry hydrogen chloride. The precipitated solid is isolated and dissolved in a solvent made up of 25 ml. of ethanol and 350 ml. of 2% hydrochloric acid. This solution is warmed on a steam bath for 15 minutes, cooled, washed with ether, and neutralized with cold, concentrated aqueous sodium hydroxide. Solid potassium carbonate is added with stirring and the solid 17β-amino-17α-pregn-4-en-3,20-dione obtained is isolated by filtration, washed with water, and dried under reduced pressure; $[\alpha]_D^{25}$, +83° (1% in methanol). The hydrochloride salt is prepared by treating an ether solution of the free base with a slight excess of anhydrous hydrogen chloride; M.P. >305° C., after crystallization from isopropyl alcohol-ethyl acetate; $[\alpha]_D^{24}$, +117° (1.1% in methanol).

The 17β-benzylideneamino-17α-pregn-5-en-3β-ol-20-one used as starting material in the foregoing procedure is prepared as follows. A solution of 5.9 g. of 17β-amino-17α-pregn-5-en-3β-ol-20-one and 12 ml. of benzaldehyde in 750 ml. of benzene is kept at room temperature for 30 minutes and is then heated under reflux under a water trap for 75 minutes, or until no more water distils. The solution is then cooled, evaporated to dryness under reduced pressure, and the oily residue is triturated with cold acetonitrile. The crystalline 17β-benzylidene-17α-pregn-5-en-3β-ol-20-one obtained is isolated by filtration, washed with cold acetonitrile, and dried under reduced pressure at room temperature; M.P. 221–223° C., after crystallization from acetonitrile; $[\alpha]_D^{24}$, +142° (1% in chloroform).

*Example 4*

A mixture of 2.0 g of 17β-benzylideneamino-17α-pregn-5-en-3β-ol-20-one, 120 ml. of toluene, 24 ml. of cyclohexanone, and 3.0 g. of aluminum isopropoxide is heated under reflux for 1 hour. The cooled solution is diluted with ether, washed several times with a saturated aqueous solution of sodium potassium tartrate, then with water, and dried over anhydrous magnesium sulfate. After the solvent is evaporated under reduced pressure, the residue is subjected to steam distillation to give 17β-benzylideneamino-17α-pregn-4-en-3,20-dione, M.P. 229–231° C., after crystallization from acetonitrile; $[\alpha]_D^{24}$, +292° (1.2% in chloroform).

To a solution of 2.1 g. of 17β-benzylideneamino-17α-pregn-4-en-3,20-dione in 25 ml. of ethanol is added 350 ml. of 2% hydrochloric acid and the resulting acidic solution is heated under reflux for 15 minutes. After cooling, the solution is washed with ether and neutralized with cold, concentrated aqueous sodium hydroxide. Solid potassium carbonate is added with stirring and the solid 17β-amino-17α-pregn-4-en-3,20-dione obtained is isolated by filtration, washed with water and dried under reduced pressure at room temperature. The hydrobromide salt is prepared by treating an ether solution of the free base with a slight excess of anhydrous hydrogen bromide.

Example 5

A mixture of 0.72 g. of 17β-benzylideneamino-17α-pregn-5-en-3β-ol-20-one and 12 ml. of methyl iodide in 250 ml. of acetonitrile is heated under reflux for 72 hours. The resulting solution is cooled, concentrated under reduced pressure to about 20 ml., and diluted with 400 ml. of ether. The precipitated solid, which is the methiodide salt of 17β-benzylideneamino - 17α - pregn-5-en-3β-ol-20-one, is isolated, washed with ether, dried, and dissolved in 500 ml. of water containing 10 ml. of 12 N hydrochloric acid. After standing a few minutes, the solution is cooled, washed three times with ether, and neutralized with cold, concentrated aqueous sodium hydroxide. Solid potassium carbonate is added to the neutral solution with stirring, and the solid 17β-methylamino-17α-pregn-5-en-3β-ol-20-one obtained is isolated by filtration, washed with water and dried. The hydrochloride salt is prepared by treating an ether solution of the free base with a slight excess of anhydrous hydrogen chloride; M.P. 215.5–217° C., after crystallization from aqueous isopropyl alcohol; $[\alpha]_D^{24}$, +5.3° (1% in methanol).

By the substitution of 15 ml. of ethyl bromide for the methyl iodide in the foregoing procedure, there is obtained 17β-ethylamino-17α-pregn-5-en-3β-ol-20-one.

By the substitution of 17.5 ml. of propyl bromide for the methyl iodide in the procedure of this example, there is obtained 17β-propylamino-17α-pregn-5-en-3β-ol-20-one.

Example 6

A mixture of 17.3 g. of 17β-benzylideneamino-17α-pregn-4-en-3,20-dione and 25 ml. of methyl iodide in 375 ml. of acetonitrile is heated under reflux for 72 hours. After cooling, the solution is concentrated under reduced pressure to about 25 ml., and diluted with 500 ml. of ether. The precipitated solid, which is the methiodide salt of 17β-benzylideneamino-17α-pregn-4-en-3,20-dione, is isolated, washed with ether, dried, and dissolved in 1500 ml. of 0.2 N hydrochloric acid. After standing a few minutes, the solution is cooled, washed three times with ether, and neutralized with cold, concentrated aqueous sodium hydroxide. Solid potassium carbonate is added with stirring and the solid 17β-methylamino-17α-pregn-4-en-3,20-dione obtained is isolated, washed with water, and dried. The hydrochloride salt is obtained by treating an ether solution of the free base with a slight excess of anhydrous hydrogen chloride.

The citrate salt of 17β-methylamino-17α-pregn-4-en-3,20-dione is prepared by treating an ether solution of the free base with an ether solution containing an equivalent amount of citric acid, evaporating the mixture to near-dryness under reduced pressure, and isolating the precipitated salt.

In the foregoing procedure, by the substitution of 31 ml. of ethyl bromide for the methyl iodide, there is obtained 17β-ethylamino-17α-pregn-4-en-3,20-dione.

In the foregoing procedure, by the substitution of 36 ml. of propyl bromide for the methyl iodide, there is obtained 17β-propylamino-17α-pregn-4-en-3,20-dione.

I claim:

1. A member of the class consisting of 17β-amino-17α-pregnen-20-one compounds having the formula

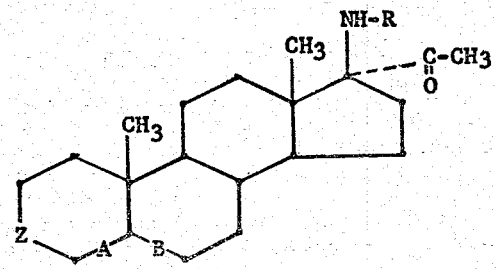

and pharmaceutically-acceptable acid-addition salts thereof; where R is a member of the class consisting of hydrogen and lower alkyl; Z is a member of the class consisting of carbonyl and β-hydroxymethylene groups; A and B are members of the class consisting of double bonds and single bonds: and Z, A, and B are selected to constitute one of the combinations Z=carbonyl
A=double bond
B=single bond, Z=β-hydroxymethylene
A=single bond
B=double bond.

2. 17β-amino-17α-pregn-5-en-3β-ol-20-one.
3. 17β-amino-17α-pregn-4-en-3,20-dione.
4. 17β-methylamino-17α-pregn-5-en-3β-ol-20-one.
5. 17β-methylamino-17α-pregn-4-en-3,20-dione.
6. Process for the production of 17β-amino-17α-pregn-5-en-3β-ol-20-one which comprises the reaction of a compound of the formula

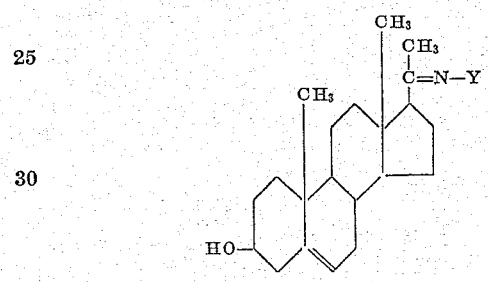

with an alkali metal hydride, followed by hydrolysis of the reaction product mixture with an acidic aqueous medium; where Y is a member of the class consisting of tosylate, acetate, halide, and trialkyl quaternary ammonium salt groupings.

7. Process for the production of 17β-amino-17α-pregn-5-en-3β-ol-20-one which comprises the reaction of a trialkylhydrazonium salt of pregnenolone, having the formula

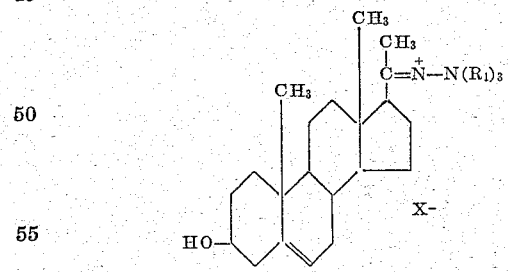

with an alkali metal hydride, followed by hydrolysis of the reaction product mixture with an acidic aqueous medium; where $R_1$ is lower alkyl and $X^-$ is one equivalent of a monovalent anion chosen from the class consisting of halide, methosulfate, benzenesulfonate, and p-toluenesulfonate anions.

8. Process for the production of 17β-amino-17α-pregn-5-en-3β-ol-20-one which comprises the reaction of 2-(3β-hydroxypregn-5-en-20-ylidene)-1,1,1 - trimethylhydrazonium iodide with sodium hydride, followed by hydrolysis of the reaction product mixture with an aqueous mineral acid.

No references cited.

LEWIS GOTTS, *Primary Examiner*.